May 5, 1953

J. D. RUST 2,637,156

COTTON PICKER SPINDLE MOISTENING APPARATUS

Filed May 11, 1949

INVENTOR,
John D. Rust,
BY
Albert E. Dieterich,
ATTORNEY.

May 5, 1953
J. D. RUST
2,637,156
COTTON PICKER SPINDLE MOISTENING APPARATUS
Filed May 11, 1949
3 Sheets-Sheet 2
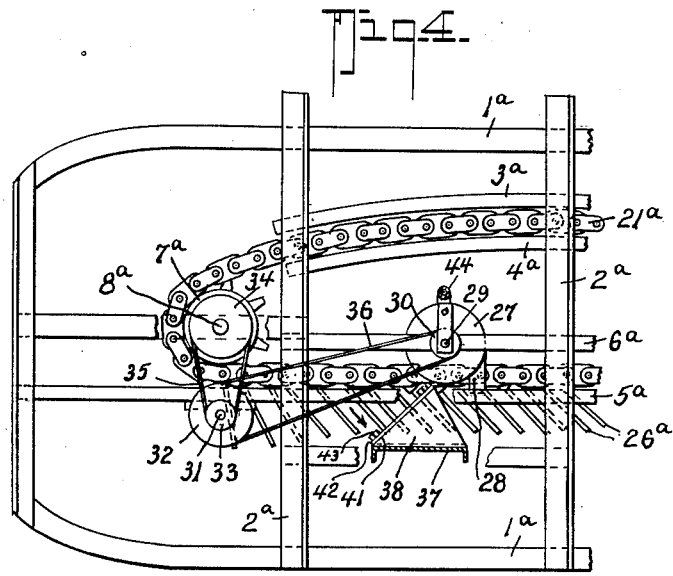
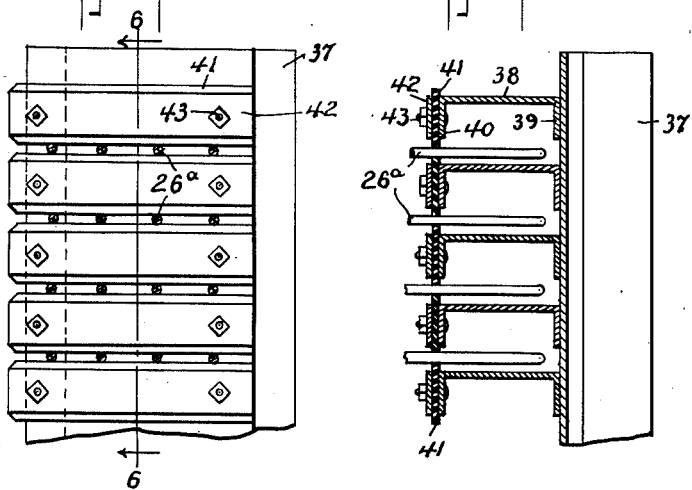
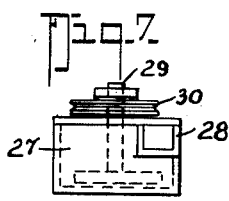
INVENTOR,
John D. Rust,
BY
Albert E. Dieterich,
ATTORNEY.

May 5, 1953  J. D. RUST  2,637,156
COTTON PICKER SPINDLE MOISTENING APPARATUS
Filed May 11, 1949  3 Sheets-Sheet 3
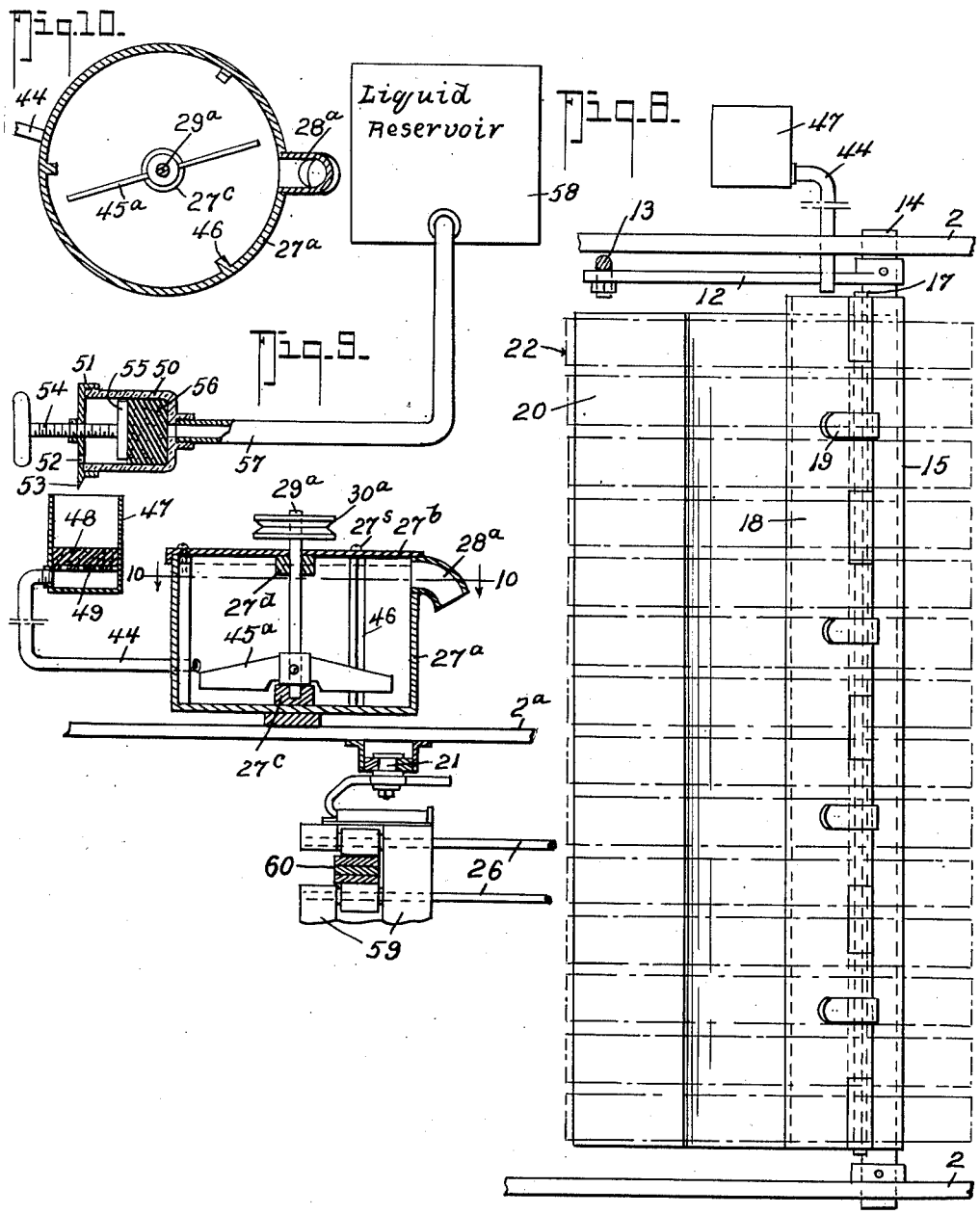
Inventor,
John D. Rust,
By Albert E. Dieterich,
ATTORNEY.

Patented May 5, 1953

2,637,156

UNITED STATES PATENT OFFICE 2,637,156

COTTON PICKER SPINDLE MOISTENING APPARATUS

John D. Rust, Memphis, Tenn.

Application May 11, 1949, Serial No. 92,712

6 Claims. (Cl. 56—42)

My present invention relates in general to cotton picking machines of the rotating spindle type and more in particular to a cotton picker such as shown in Rust Patents Numbers 1,894,198; 1,910,307; 2,058,514; and 2,533,630.

The object of this invention is to provide simple and efficient means for applying a suitable liquid (for example, sodium alkyl aryl sulfonate solution) to the cotton picking spindles in the form of foam or suds. A survey of the cotton picker art will show that there have been two approaches to the problem of making rotating spindles effective in wrapping up cotton and removing it from the plant. The first approach was to provide the spindle with teeth with which to positively catch the lint. The other was to apply moisture to a smooth surfaced spindle to cause it to wrap up the lint.

This last approach is the one I have used from the beginning of the development of my wire spindle cotton picker. However, as the patent records will show, I found by experience that the smooth wire spindles became so highly polished in operation that the picking effectiveness became considerably decreased. Therefore, I spent a great deal of time and effort developing means for creating and maintaining a slightly roughened surface on the spindles in order to increase their effectiveness for picking the open cotton.

During the last few years a great deal of progress has been made in the development of wetting agents for reducing the surface tension of water. I have experimented with many kinds of wetting agents and have found that some of them, when properly applied to the smooth wire spindle, increase considerably their picking efficiency. But during a recent picking season I discovered that by using an agent (for example, sodium alkyl aryl sulfonate solution) that would foam and make suds or lather when agitated, and applying the moisture to the spindles in the form of suds, the picking efficiency of the smooth spindle has been raised to a highly satisfactory degree. So far as I know, I am the first to make this discovery.

I propose two basic methods for creating and applying suds to the cotton picker spindles. First, I use mechanism substantially the same as shown in my application Serial No. 737,702, filed March 27, 1947, now Patent 2,525,184, except that I add the improvement of oscillating means for agitating the sponge to create a foam or suds which in turn is applied to the spindles by the rotating moistener bands. Second, I propose a rotary means for simultaneously creating the suds and depositing it downwardly onto the spindles in combination with stationary means for wiping the surplus suds from the spindles. This rotary means might also be used in combination with the rotating moistener bands.

To the attainment of the aforesaid objects and ends my invention further resides in the novel method and apparatus hereinafter described and illustrated in the accompanying drawings in which:

Fig. 4 is a view similar to Fig. 1 showing a modification of the invention.

Fig. 5 is a detailed elevational view, on an enlarged scale, looking in the direction of the arrow in Fig. 4 of a portion of the spindle wiper, the spindles being shown in section.

Fig. 6 is a section on the line 6—6 of Fig. 5.

Fig. 7 is a detail elevation of the foam producer.

Fig. 8 is a detail elevation of the sponge holder, its operating arm and the means for feeding suds forming liquid to the holder, the position of the moistener 22 being shown in dot and dash lines.

Fig. 9 is a schematic view partly in elevation and partly in vertical section, showing a modification.

Fig. 10 is a horizontal section on the line 10—10 of Fig. 9.

Figure 1:
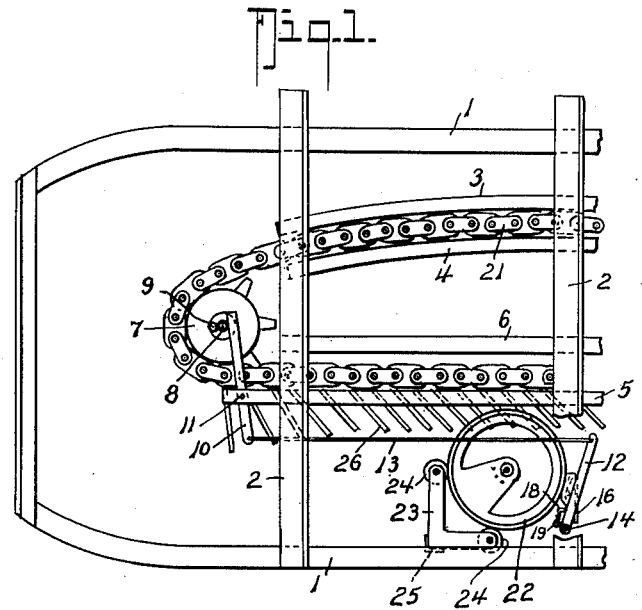
Fig. 1 is a top plan view of a portion of a cotton picking unit with one embodiment of my present invention applied, parts being broken away and cover plates removed.
Figures 2, 3:
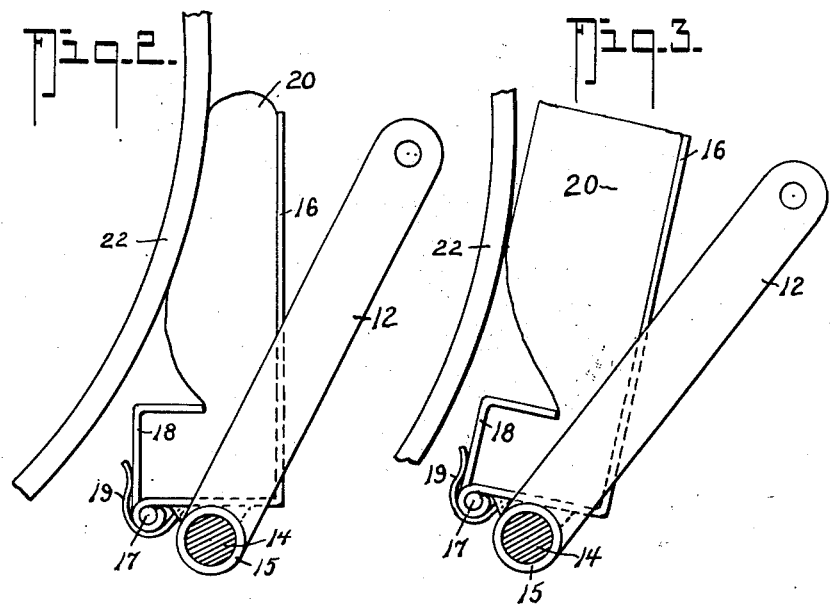
Fig. 2 is an enlarged detail plan view showing the sponge holder shown in Fig. 1 in the squeezed position.
Fig. 3 is a view similar to Fig. 2 but showing the sponge holder and sponge in the released position.

Referring now particularly to the first embodiment of my invention shown in Figs. 1 to 3 and 8 inclusive of the drawings, it will be seen that 1 designates the main frame of the picker unit, 2 the cross beams and 3, 4, 5 and 6 the chain guides of the spindle slat conveyer chains 21 each of which takes around a drive sprocket 7 to whose axle 8 an eccentric pin carrying disc 9 is secured.

Pivoted at 11 to a frame bar 5 is a lever 10, one end of which is adapted to normally rest against axle 8 and be engaged, once in each revolution of the axle, by said pin to rock the lever.

The lever 10 is connected by a rod 13 to an arm 12 that is secured to a tubular support 15 for the sponge carrier 16, 17, 18, 19. The support is pivotally mounted on a rod 14 suitably supported by the frame 1.

The sponge carrier includes a vertically disposed angle plate 16 to which is hinged on a rod 17 a shorter angle plate 18 between which and plate 16 is a sponge 20. The plates 16, 18 are held to clamp an edge of the sponge between them by means of spring clips 19. One end of each clip is welded to the plate 16 while the other end of the clip engages the plate 18 to push it in a clockwise direction in Figs. 2 and 3. The construction of the sponge holder is substantially the same as that shown in my application aforesaid and the sponge used is preferably an artificial sponge (sponge rubber) and bears against the rotary spindle moistener 22.

The moistener 22 is in part supported by rollers 24 carried on angles 23 secured to an angle bar 25 fixed to the frame 1 of the picker unit, and in part by the sponge 20 and its holder and in part by the spindles 26 as they pass through between the rings of the moistener.

The moistener 22 is of known construction (see my application aforesaid and also Patent No. 2,023,491 issued December 10, 1935) and no claim thereto per se is made in this application.

As shaft 8 turns it will, once in each revolution, rock lever 10 which in turn will pull arm 12 via connecting rod 13 and thereby squeeze sponge 20 against the moistener.

The frame or suds forming liquid hereinbefore referred to is deposited on the sponge 20 in the usual way. The alternate squeezing and releasing of the sponge causes such fluid to foam so that the liquid is applied to the moistener in the form of a foam or suds and carried by the moistener in that form to the spindles.

Another embodiment of my invention is illustrated in Figs. 4 to 7 inclusive by reference to which it will be seen that I have provided a high speed rotary beater consisting of a receptacle 27 into which the fluid is placed via an inlet 44 and beaten into a foam or suds by means of a rotatable agitator 29 before it is deposited over the spindles via an outlet spout 28. The agitator 29 is driven from shaft 8ᵃ via a speed increasing drive consisting of pulley 34, belt 35, pulley 33 on a shaft 31, a second pulley 32 on shaft 31, belt 36, to pulley 30 on the shaft 29 of the rotary agitator.

In Figs. 9 and 10 I have disclosed a slight modification of the beater shown in Fig. 7 and have shown a means to supply foam producing liquid to the same in measured or regulated quantities. In these figures 27ᵃ is the casing, 27ᵇ its cover, 27ᶜ and 27ᵈ bearings for the beater shaft 29ᵃ which has the pulley 30ᵃ, 28ᵃ the suds discharge spout and 45ᵃ the beater blade. The casing 27ᵃ is provided with baffle bars 46 tapped for the cover screws 27ˢ.

Fluid to be foamed or made into suds is led from a container 47 to the regulator valve casing 27ᵃ by a tube 44 that discharges about the level of the beater blades into casing 27ᵃ. The container 47 has a screen 49 located above its outlet, on which screen is a sponge 48. Fluid from a reservoir 58 is conducted, via a tube 57, to a regulator valve casing 56 where it passes through an elastic sponge 56 and out of a discharge opening 52, over a lip 53 into container 47. The density of the sponge (rubber) 56 is adjusted by means of a regulating screw 54 and piston 55.

The regulator valve, etc. is preferably located on the machine at a place convenient for observation and adjustment by the operator.

The desired rate of flow can be maintained indefinitely once the valve has been adjusted, because the accumulation of small particles of foreign matter on the sponge does not perceptibly offset the flow. By making the cup or casing 50 of transparent material the operator may at all times be able to observe the flow of liquid.

The beater discharges or drops the foam or suds onto the spindles in advance of a wiper device consisting of a vertical support 37 on which is a series of channel plates 38, one flange 39 of each of which is welded or bolted to the support 37 and the other flange 40 carries a rubber wiper strip 41, the strip 41 being held replaceably to the flange 40 by means of a clamp plate 42 and bolts and nuts 43, see Figs. 5 and 6. The spindles 26ᵃ are drawn between adjacent strips 41 and excess foam is thereby wiped from the spindles.

The foam or suds as it is forced from the beater through spout 28 flows onto the spindles by gravity.

In each instance the foam or suds is applied to the spindles before they enter the cotton on the cotton plants.

The spindle slats 59 and tracks 60 are of known construction (see Patent No. 2,440,450 issued April 27, 1948) and per se are not a part of the present invention.

This application is continuation in part of my application filed January 12, 1948, Serial No. 1,707 now abandoned.

From the foregoing description, taken in connection with the accompanying drawings, it is thought that the construction, operation and advantages of the invention will readily appear to those skilled in the art.

What I claim is:

1. In a cotton picking unit having an endless conveyor with a plurality of spindle carrying slats thereon, means carried by said unit for driving said conveyor, means carried by said unit for applying a liquid in the form of suds or foam to the spindles including a receptacle, an agitator positioned in said receptacle, a tube communicating with said receptacle for delivering a liquid capable of producing foam or suds, driving mechanism connecting said agitator with said driving means and an outlet spout provided on said receptacle for delivering suds or foam to said spindles.

2. In a cotton picking unit having an endless conveyor with a plurality of spindle carrying slats thereon, means carried by said unit for driving said conveyor, means carried by said unit for applying a liquid in the form of suds or foam to the spindles including a receptacle, an agitator positioned in said receptacle, a tube communicating with said receptacle for delivering a liquid capable of producing foam or suds, driving mechanism connecting said agitator with said driving means, an outlet spout provided on said receptacle for delivering suds or foam to said spindles and means carried by said unit positioned in the path of the spindles to wipe excess foam or suds therefrom prior to the spindles engagement with the cotton.

3. In a cotton picking unit having an endless conveyor with a plurality of spindle carrying slats thereon, a drive shaft with a sprocket thereon engaging said conveyor, means carried by said unit for applying a liquid in the form of suds or foam to the spindles including a receptacle, a tube communicating with said receptacle for delivering a liquid capable of producing foam or suds, an agitator positioned in said receptacle, a pulley secured to the shaft of said agitator, an outlet spout provided on said receptacle for directing the foam or suds onto said spindles and driving mechanism connecting said pulley with said drive shaft for rotating said agitator for delivering suds or foam through said outlet spout.

4. In a cotton picking unit having an endless conveyor with a plurality of spindle carrying slats thereon, means carried by said unit for driving said conveyor, means carried by said unit for applying a liquid in the form of suds or foam to the spindles including a receptacle, an agitator positioned in said receptacle, a liquid reservoir positioned immediately above said unit, a tube connecting said reservoir with said receptacle for delivering a liquid capable of producing foam or suds, a fluid regulator interposed in said tube for metering the flow of liquid to said receptacle, an outlet spout provided on said receptacle for directing the foam or suds onto said spindles and driving mechanism connecting said agitator with said driving means for rotating said agitator to deliver suds or foam through said outlet spout.

5. In a cotton picking unit having an endless conveyor with a plurality of spindle carrying slats thereon, means carried by said unit for driving said conveyor, means carried by said unit for applying a liquid in the form of suds or foam to the spindles including a receptacle, an agitator positioned in said receptacle, a liquid reservoir positioned immediately above said unit, a tube connecting said reservoir with said receptacle for delivering a liquid capable of producing foam or suds, a fluid regulator interposed in said tube for metering the flow of liquid to said receptacle, an outlet spout provided on said receptacle for directing the foam or suds onto said spindles, driving mechanism connecting said agitator with said driving means for rotating said agitator to deliver suds or foam through said outlet spout and resilient means carried by said unit positioned in the path of said spindles to wipe excess foam or suds therefrom prior to spindles engaging the cotton.

6. In a cotton picking unit having an endless conveyor with a plurality of spindle carrying slats thereon, means carried by said unit for driving said conveyor, means carried by said unit for applying a liquid in the form of suds or foam to the spindles including a receptacle, an agitator positioned in said receptacle, a liquid reservoir positioned immediately above said unit, a tube connected to said reservoir, a metering valve secured to the free end of said tube, a container associated with said metering valve, a tube connecting said container with said receptacle for delivering a liquid capable of producing foam or suds, an outlet spout provided on said receptacle for directing the foam or suds onto said spindles and driving mechanism connecting said agitator with said driving means for rotating said agitator to deliver suds or foam through said outlet spout.

JOHN D. RUST.

References Cited in the file of this patent

UNITED STATES PATENTS

| Number | Name | Date |
|---|---|---|
| 1,742,493 | Berry | Jan. 7, 1930 |
| 1,938,264 | Templeton | Dec. 5, 1933 |
| 1,946,741 | Hamme | Feb. 13, 1934 |
| 1,982,884 | Schroder et al. | Dec. 4, 1934 |
| 2,023,491 | Rust et al. | Dec. 10, 1935 |
| 2,482,557 | Rust | Sept. 20, 1949 |